United States Patent
Hulliger

[11] Patent Number: 5,868,225
[45] Date of Patent: Feb. 9, 1999

[54] BRAKE ACTUATOR WITH INCREASED TOLERANCE

[75] Inventor: Claude Hulliger, Thiers Sur Theve, France

[73] Assignee: Bosch System De Freinage, Drancy, France

[21] Appl. No.: 700,462

[22] PCT Filed: Sep. 6, 1996

[86] PCT No.: PCT/FR96/01375

§ 371 Date: Sep. 13, 1996

§ 102(e) Date: Sep. 13, 1996

[87] PCT Pub. No.: WO97/18405

PCT Pub. Date: May 22, 1997

[30] Foreign Application Priority Data

Nov. 17, 1995 [FR] France ................................ 95 13630

[51] Int. Cl.[6] ................................................. F16D 55/18
[52] U.S. Cl. ...................... 188/72.4; 188/72.6; 188/72.9; 188/71.9
[58] Field of Search .................... 188/72.4, 72.6, 188/72.9, 72.2, 72.7, 72.8, 196 M, 196 V, 71.9

[56] References Cited

U.S. PATENT DOCUMENTS

| | | | |
|---|---|---|---|
| 3,638,763 | 2/1972 | Laverdant | 188/72.6 |
| 4,637,498 | 1/1987 | Thompson et al. | 188/72.6 X |
| 4,784,245 | 11/1988 | Fabbro et al. | 188/196 M X |
| 4,981,197 | 1/1991 | Antony et al. | 188/71.9 |
| 5,038,895 | 8/1991 | Evans | 188/72.7 |
| 5,586,623 | 12/1996 | Mery | 188/72.6 |
| 5,609,227 | 3/1997 | Mery | 188/72.6 X |

Primary Examiner—Robert J. Oberleitner
Assistant Examiner—Pamela J. Lipka
Attorney, Agent, or Firm—Leo H. McCormick, Jr.

[57] ABSTRACT

A brake actuator having a mechanical actuating member (3) with an automatic adjusting device (5) to compensate for wear associated with friction members (6a,6b). The adjusting device (5) has a variable length created by an elongated nut (7) and a screw (9) which are urged in an unscrewing direction by a force from a spring (16) which is prestressed within a retention member (17). The retention member (17) has a first end which engages a second plate (14) and a second end which engages spring (16) to define a caged structure, The spring urging the elongated nut (7) into engagement with a first plate (12) and the first plate (12) into engagement with the second plate (14). A cylindrical sleeve (18) has a radial collar (18a) which is trapped between the spring (16) and second end of the retention member (17) to slidably engage the second end (7b) of the elongated nut (7) for guiding the second end (7b) into alignment with screw (9).

1 Claim, 1 Drawing Sheet

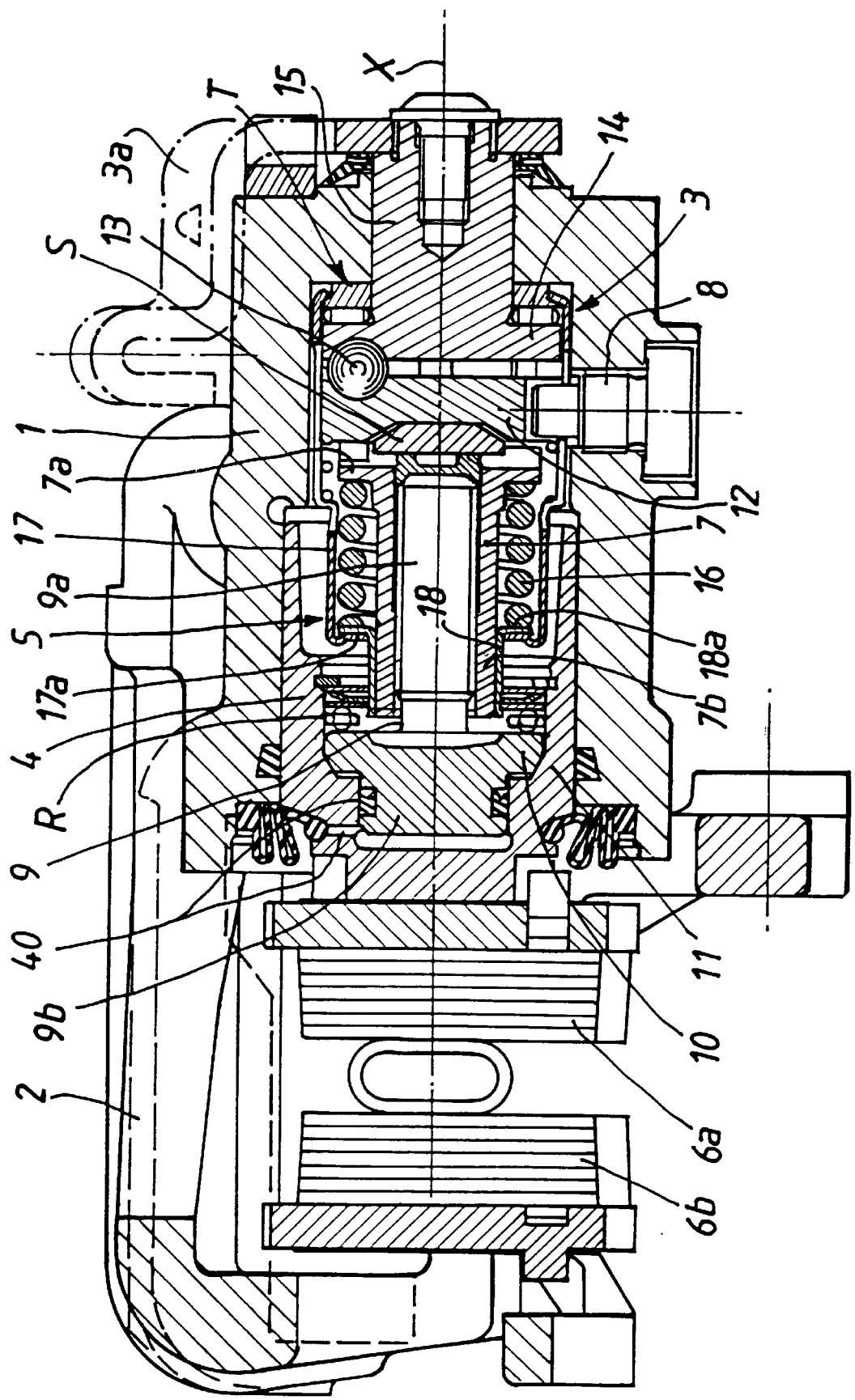

BRAKE ACTUATOR WITH INCREASED TOLERANCE

The present invention relates to a brake actuator comprising : a substantially cylindrical body filled with a hydraulic fluid which is subjected to a variable pressure; a mechanical actuating means including two plates for relative rotation forming an assembly which presents, in an axial direction, a thickness which is adapted to be controlled by the actuation of a control member which is accessible from the exterior of the body; a brake piston which closes off the body sealingly and is adapted to slide therein in response to the action of the actuating means to actuate in turn at least one friction means; and an automatic adjustment device disposed within the body between the mechanical actuating means and the piston to compensate for play resulting, from wear of the friction means, this device itself comprising a selectively rotatable screw, onto a first end of which is engaged an elongated nut which is rotationally fixed; a prestressed spring which applies a first end of the nut against at least one of the plates; and a retention member against which the spring bears and which urges together the at least one plate, the first end of the nut, and the spring; the second end of the screw being engaged into an orifice formed in the piston, which it closes off sealingly so as to be subjected to atmospheric pressure, and which presents a conical shoulder adapted to be selectively locked against rotation by an internal conical surface of the piston, which is fixed rotationally, against which this shoulder is urged with a force which increases with the pressure of the hydraulic fluid.

BACKGROUND OF THE INVENTION

A brake actuator of this kind is known in the prior art, for example from the international patent application document PCT/FR93,00918 (U.S. Pat. 5,586,623.

One of the problems which is encountered in the design of brake actuators, whatever structure they have, consists in ensuring that they have a very high degree of operational reliability in a context of large volume production and reduction of manufacturing) costs.

In particular, it appears more and more to be necessary to provide that the operation of these brake actuators will be irreproachable even when the limits of the manufacturing tolerances are reached.

SUMMARY OF THE INVENTION

The invention has precisely as objective to provide a brake actuator of robust design which meets the current manufacturing requirements for large volume production.

To this end, the brake actuator of the invention is essentially characterised in that in addition to the elements already referred to, it comprises an axial cylindrical sleeve within which the nut is guided by its second end and which is provided with a radial collar trapped between the spring and the retention member

BRIEF DESCRIPTION OF THE DRAWINGS

Other features and advantages of the invention will appear clearly from the description of the invention which is given hereafter, by way of indication and without limitation, with reference to the accompanying drawing which represents, in sectional view, a brake actuator in accordance with the invention

DETAILED DESCRIPTION OF THE INVENTION

The invention relates to a brake actuator comprising an essentially cylindrical body 1 filled with brake fluid which is subjected to a variable pressure, the body being solid with a caliper 2.

A mechanical actuation means 3, comprising a rotary control lever 3a which is accessible from the exterior of the body, is additionally housed within the body.

A brake piston 4 is mounted slidingly within the body I which it closes off sealingly, the displacement of this piston being controlled by the actuating means 3 through a spacer 5 of variable length, and enabling the displacement of two friction members 6a, 6b, of which one is retained by the caliper 2 and the other is pushed by this piston.

The spacer 5, which forms part of an automatic adjustment device designed to compensate the play which results from the wear of the friction members, comprises on one hand an elongate nut 7 which is indirectly locked against rotation by a peg, 8 which is solid with the body 1, and on the other hand by a screw 9. the nut being engaged onto the first end 9a of the screw 9. The second end 9b of the screw is engaged into an orifice 40 which is formed within the piston 4 and which it closes off sealingly so as to be subjected to atmospheric pressure.

Additionally, the second end 9b of the screw 9 presents a conical shoulder 10 which is adapted to bear against an internal conical surface 11 in the piston 4.

The elongate nut 7 and the screw 9 are urged by an elastic force in a direction which is suitable to unscrew one from the other and to increase correspondingly the length of the spacer 5 which they together form this elastic force being applied to the screw 9 through the intermediary of a roller bearing R so as to enable rotation of the screw during the increase of the pressure of the brake fluid, until the position is reached where the conical shoulder 10 becomes locked against rotation by the internal surface 11 of the piston 4.

More specifically the mechanical actuating means 3 is of the kind comprising a rotary plate with balls and cams, and comprises a first plate 12 which is locked against rotation by a peg 8 and which itself locks against rotation the first end 7a of the elongate nut 7 by the intermediary of a shoe S, balls such as 13, and a second plate 14 which is connected to a shaft 15 passing sealingly through the body and providing the connection of the control lever 3a, a roller bearing T being disposed between the body 1 and the second plate 14 to enable the second plate to rotate readily.

The elastic force which tends to unscrew the nut 7 from the screw 9 is essentially exerted by a prestressed spring 16, which applies the first end 7a of the nut, shaped with a radial shoulder, against the plates 12 and 14.

To this end, the spring, 16, the first end 7a of the nut, the plates 12 and 14 and the balls 13 are held together by a retention member 17, which takes the form or example of a cage 17 crimped onto the outer face of the bearing T, and of which a radially reduced portion 17a presents a bearing surface for the spring 16.

In accordance with the invention, the brake actuator also comprises a cylindrical sleeve 18, having the same axis X as the body 1, within which the nut 7 is guided with a small clearance by its second end 7b, and which is provided with a radial collar 18a trapped between the spring 16 and the radially reduced portion 17a of the retention member 17, this arrangement enabling the coaxiality of the screw 9 and the nut 7 to be guaranteed in all circumstances.

I claim:

1. A brake actuator comprising a substantially cylindrical body filled with a hydraulic fluid which is subjected to a variable pressure;

a mechanical actuating means including first and second plates for relative rotation forming an assembly which presents, in an axial direction, a thickness which is adapted to be controlled by the actuation of a control member which is accessible from the exterior of said cylindrical body;

a brake piston which sealingly closes off said cylindrical body and is adapted to slide therein in response to the action of said actuating means to actuate in turn at least one friction means; and an automatic adjustment device disposed within said cylindrical body between said mechanical actuating means and said brake piston to compensate for play resulting from wear of said friction means, said adjustment device including a selectively rotatable screw and an elongated nut, said rotatable screw having a first end and a second end, said elongated nut having a first end and a second end, said first end of said screw engaging said first end of said elongate nut, said elongated nut being rotationally fixed; a prestressed spring which urges said second end of said nut against said first plate; and a retention member having a first end engaging said second plate and a second end engaging said spring for caging said spring, said spring urging together said second end of the nut, said first plate and said spring, said second end of said screw being engaged into an orifice formed in said piston, which it closes off sealingly so as to be subjected to atmospheric pressure, said second end of said screw having a conical shoulder which is adapted to be selectively locked against rotation by an rotationally fixed internal conical surface of said piston, said conical shoulder on said second end of said screw being urged into engagement with said conical surface of said piston by a force which increases as a function of a pressure of said hydraulic fluid, characterised in that said retention member further includes an axial cylindrical sleeve having a radial collar trapped between said spring and said first end of said retention member, said sleeve slidably engages said elongated nut for guiding second end into alignment with said screw.

\* \* \* \* \*